United States Patent
Lee et al.

(10) Patent No.: US 9,980,175 B2
(45) Date of Patent: May 22, 2018

(54) METHOD AND APPARATUS FOR PERFORMING TRAFFIC STEERING IN WIRELESS COMMUNICATION SYSTEM

(71) Applicant: LG ELECTRONICS INC., Seoul (KR)

(72) Inventors: Jaewook Lee, Seoul (KR); Sunghoon Jung, Seoul (KR)

(73) Assignee: LG Electronics Inc., Seoul (KR)

(*) Notice: Subject to any disclaimer, the term of this patent is extended or adjusted under 35 U.S.C. 154(b) by 0 days. days.

(21) Appl. No.: 15/114,679

(22) PCT Filed: Jan. 26, 2015

(86) PCT No.: PCT/KR2015/000781
§ 371 (c)(1),
(2) Date: Jul. 27, 2016

(87) PCT Pub. No.: WO2015/115759
PCT Pub. Date: Aug. 6, 2015

(65) Prior Publication Data
US 2016/0353324 A1    Dec. 1, 2016

Related U.S. Application Data

(60) Provisional application No. 61/932,254, filed on Jan. 28, 2014.

(51) Int. Cl.
*H04W 36/00* (2009.01)
*H04W 28/08* (2009.01)
(Continued)

(52) U.S. Cl.
CPC ........... *H04W 28/08* (2013.01); *H04W 48/10* (2013.01); *H04W 76/04* (2013.01); *H04W 84/12* (2013.01)

(58) Field of Classification Search
CPC ..... H04W 28/08; H04W 24/00; H04W 16/06; H04W 8/183; H04W 48/18; H04W 36/30;
(Continued)

(56) References Cited

U.S. PATENT DOCUMENTS

2004/0192284 A1* 9/2004 Vaisanen ............... H04W 48/12
455/422.1
2007/0249291 A1 10/2007 Nanda et al.
(Continued)

FOREIGN PATENT DOCUMENTS

KR          10-1055109 B1    8/2011
KR       10-2013-0017663 A   2/2013

OTHER PUBLICATIONS

Broadcom Corporation, "Dedicated Signaling to carry WLAN interworking Policy's assistance Information", R2-132797, 3GPP TSG-RAN WG2 Meeting #83, Barcelona, Spain, Aug. 19-23, 2013, 3 pages.(http://www.3gpp.org/ftp/tsg_ran/wg2_rl2/TSGR2_83/Docs/).

*Primary Examiner* — Dai A Phuong
(74) *Attorney, Agent, or Firm* — Birch, Stewart, Kolasch & Birch, LLP (57) ABSTRACT

A method and apparatus for performing traffic steering from a 3rd generation partnership project (3GPP) access network to a wireless local area network (WLAN) in a wireless communication system is provided. A user equipment (UE) receives radio access network access network (RAN) assistance information for evaluating traffic steering from the 3GPP access network to the WLAN, and attempts to acquire attributes related to the RAN assistance information from a specific WLAN. If at least one of the attributes is not acquired from the specific WLAN, the UE evaluates traffic steering from the 3GPP access network to the WLAN excluding the specific WLAN. The RAN assistance infor-
(Continued)

mation includes a WLAN signal power threshold and a WLAN load threshold.

10 Claims, 7 Drawing Sheets

(51) Int. Cl.
*H04W 48/10* (2009.01)
*H04W 76/04* (2009.01)
*H04W 84/12* (2009.01)

(58) Field of Classification Search
CPC ..... H04W 36/18; H04W 36/12; H04W 36/04; H04W 16/32; H04W 28/04; H04W 72/082; H04W 4/02
USPC .......... 455/436–453, 456.1–456.3, 512–513; 370/328–334
See application file for complete search history.

(56) References Cited

U.S. PATENT DOCUMENTS

| | | | |
|---|---|---|---|
| 2008/0096552 A1* | 4/2008 | Won | H04W 36/005 455/426.1 |
| 2009/0135759 A1* | 5/2009 | Hirano | H04W 36/0083 370/328 |
| 2009/0191878 A1* | 7/2009 | Hedqvist | H04W 36/32 455/441 |
| 2010/0011112 A1 | 1/2010 | Song et al. | |
| 2010/0022250 A1* | 1/2010 | Petrovic | H04J 11/0093 455/450 |
| 2013/0073710 A1 | 3/2013 | Lee | |
| 2014/0133294 A1* | 5/2014 | Horn | H04W 28/0247 370/230 |
| 2014/0254576 A1* | 9/2014 | Varma | H04W 48/16 370/338 |
| 2015/0038142 A1* | 2/2015 | Wang | H04W 48/12 455/436 |
| 2015/0052255 A1* | 2/2015 | Sun | H04L 49/253 709/227 |
| 2015/0382269 A1* | 12/2015 | Liang | H04W 24/02 370/332 |
| 2016/0080958 A1* | 3/2016 | Rinne | H04W 24/10 370/338 |
| 2016/0112921 A1* | 4/2016 | Nagasaka | H04W 36/22 370/331 |
| 2016/0269985 A1* | 9/2016 | Bergstrom | H04W 48/18 |
| 2017/0026868 A1* | 1/2017 | Gupta | H04W 52/0225 |
| 2017/0208511 A1* | 7/2017 | Craig | H04W 12/04 |
| 2017/0257822 A1* | 9/2017 | Harris | H04W 48/16 |

\* cited by examiner

METHOD AND APPARATUS FOR PERFORMING TRAFFIC STEERING IN WIRELESS COMMUNICATION SYSTEM

CROSS REFERENCE TO RELATED APPLICATIONS

This application is the National Phase of PCT International Application No. PCT/KR2015/000781, filed on Jan. 26, 2015, which claims priority under 35 U.S.C. 119(e) to U.S. Provisional Application No. 61/932,254, filed on Jan. 28, 2014, all of which are hereby expressly incorporated by reference into the present application.

TECHNICAL FIELD

The present invention relates to wireless communications, and more particularly, to a method and apparatus for performing traffic steering in a wireless communication system.

BACKGROUND ART

Universal mobile telecommunications system (UMTS) is a 3rd generation (3G) asynchronous mobile communication system operating in wideband code division multiple access (WCDMA) based on European systems, global system for mobile communications (GSM) and general packet radio services (GPRS). A long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

3GPP/wireless local area network (WLAN) interworking has been discussed. 3GPP/WLAN interworking may be called traffic steering. From rel-8 of 3GPP LTE, access network discovery and selection functions (ANDSF) for detecting and selecting accessible access networks have been standardized while interworking with non-3GPP access (e.g., WLAN) is introduced. The ANDSF may carry detection information of access networks accessible in location of a user equipment (UE) (e.g., WLAN, WiMAX location information, etc), inter-system mobility policies (ISMP) which is able to reflect operator's policies, and inter-system routing policy (ISRP). Based on the information described above, the UE may determine which Internet protocol (IP) traffic is transmitted through which access network. The ISMP may include network selection rules for the UE to select one active access network connection (e.g., WLAN or 3GPP). The ISRP may include network selection rules for the UE to select one or more potential active access network connection (e.g., both WLAN and 3GPP). The ISRP may include multiple access connectivity (MAPCON), IP flow mobility (IFOM) and non-seamless WLAN offloading. Open mobile alliance (OMA) device management (DM) may be used for dynamic provision between the ANDSF and the UE.

The MAPCON is a standardization of a technology which enables configuring and maintaining multiple packet data network (PDN) connectivity simultaneously through 3GPP access and non-3GPP access, and enables a seamless traffic offloading in units of all active PDN connections. For this, an ANDSF server provides access point name (APN) information for performing offloading, routing rule, time of day information, and validity area information, etc.

The IFOM supports mobility in a unit of IP flow, which is more flexible and more segmented than the MAPCON, and seamless offloading. The IFOM enables access to different access networks even when the UE is connected to a PDN using the same APN, which is different from the MAPCON. The IFOM also enables mobility in a unit of specific IP traffic flow, not a unit of PDN, for a unit of mobility or offloading, and accordingly, services may be provided flexibly. For this, an ANDSF server provides IP flow information for performing offloading, routing rule, time of day information, and validity area information, etc.

The non-seamless WLAN offloading is a technology that offloads traffics completely so as not to go through the EPC as well as that changes a path of a specific IP traffic to WLAN. The offloaded IP traffic cannot be moved to 3GPP access seamlessly again since anchoring is not performed to the P-GW for mobility support. For this, an ANDSF server provides information as similar as the information provided for the IFOM.

An efficient method for 3GPP/WLAN interworking is required.

SUMMARY OF INVENTION

Technical Problem

The present invention provides a method and apparatus for performing traffic steering in a wireless communication system. The method provides a method for indicating how to use radio access network (RAN) assistance information. The present invention provides a method for defining user equipment (UE) behaviors regarding traffic steering when the UE receives RAN assistance information and the UE is not able to acquire attributes regarding the RAN assistance information.

Solution to Problem

In an aspect, a method for performing, by a user equipment (UE), traffic steering from 3rd generation partnership project (3GPP) to wireless local area network (WLAN) in a wireless communication system is provided. The method includes receiving, by the UE, parameters for evaluating traffic steering from 3GPP to a specific WLAN, attempting, by the UE, to acquire attributes which correspond to the parameters and are configured for evaluating traffic steering from 3GPP to the specific WLAN, and if at least one of the attributes is not acquired for the specific WLAN, evaluating, by the UE, traffic steering from 3GPP to other WLAN excluding the specific WLAN.

The parameters for evaluating traffic steering may be received via a dedicated signaling or broadcast signaling.

The dedicated signaling may be a radio resource control (RRC) connection reconfiguration message.

The dedicated signaling may be a system information block (SIB) type 17.

The parameters for evaluating traffic steering may include at least one of parameters for the 3GPP or parameters for the specific WLAN.

The parameters for the 3GPP may include at least one of a reference signal received power (RSRP) threshold, a reference signal received quality (RSRQ) threshold, a 3GPP radio access network (RAN) load threshold, or an indication to steer traffic to or from WLAN.

The parameters for the specific WLAN may include at least one of a WLAN signal power threshold, a WLAN signal quality threshold, WLAN load threshold, or a WLAN wide area network (WAN) metric.

In another aspect, a method for performing, by a user equipment (UE), traffic steering from 3rd generation partnership project (3GPP) to wireless local area network (WLAN) in a wireless communication system is provided. The method includes receiving, by the UE, radio access network (RAN) assistance information including an indication indicating whether the RAN assistance information is allowed to be ignored or not, attempting, by the UE, to acquire attributes related to the RAN assistance information for evaluating traffic steering from 3GPP to WLAN, and determining whether to evaluate traffic steering from 3GPP to WLAN for the RAN assistance information based on the indication.

Advantageous Effects of Invention

UE behavior regarding traffic steering can be clear.

MODE FOR THE INVENTION

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink LTE-advance (LTE-A) is an evolution of the 3GPP LTE.

For clarity, the following description will focus on the LTE-A. However, technical features of the present invention are not limited thereto.

Figure 1:
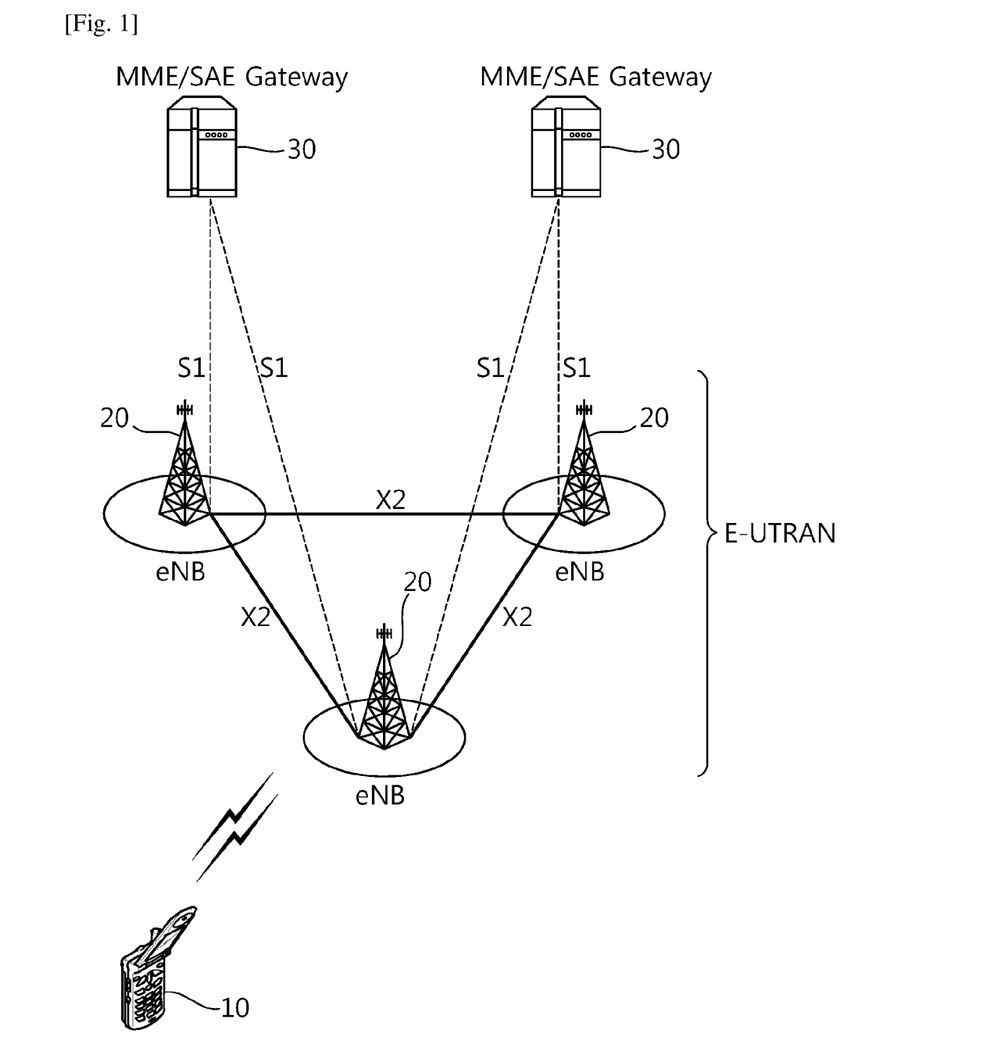
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), an access point, etc. One eNB 20 may be deployed per cell.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) and a system architecture evolution (SAE) gateway (S-GW). The MME/S-GW 30 may be positioned at the end of the network and connected to an external network. For clarity, MME/S-GW 30 will be referred to herein simply as a "gateway," but it is understood that this entity includes both the MME and S-GW.

The MME provides various functions including non-access stratum (NAS) signaling to eNBs 20, NAS signaling security, access stratum (AS) security control, inter core network (CN) node signaling for mobility between 3GPP access networks, idle mode UE reachability (including control and execution of paging retransmission), tracking area list management (for UE in idle and active mode), packet data network (PDN) gateway (P-GW) and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on access point name aggregate maximum bit rate (APN-AMBR).

Interfaces for transmitting user traffic or control traffic may be used. The UE 10 is connected to the eNB 20 via a Uu interface. The eNBs 20 are connected to each other via an X2 interface. Neighboring eNBs may have a meshed network structure that has the X2 interface. A plurality of nodes may be connected between the eNB 20 and the gateway 30 via an S1 interface.

Figure 2:
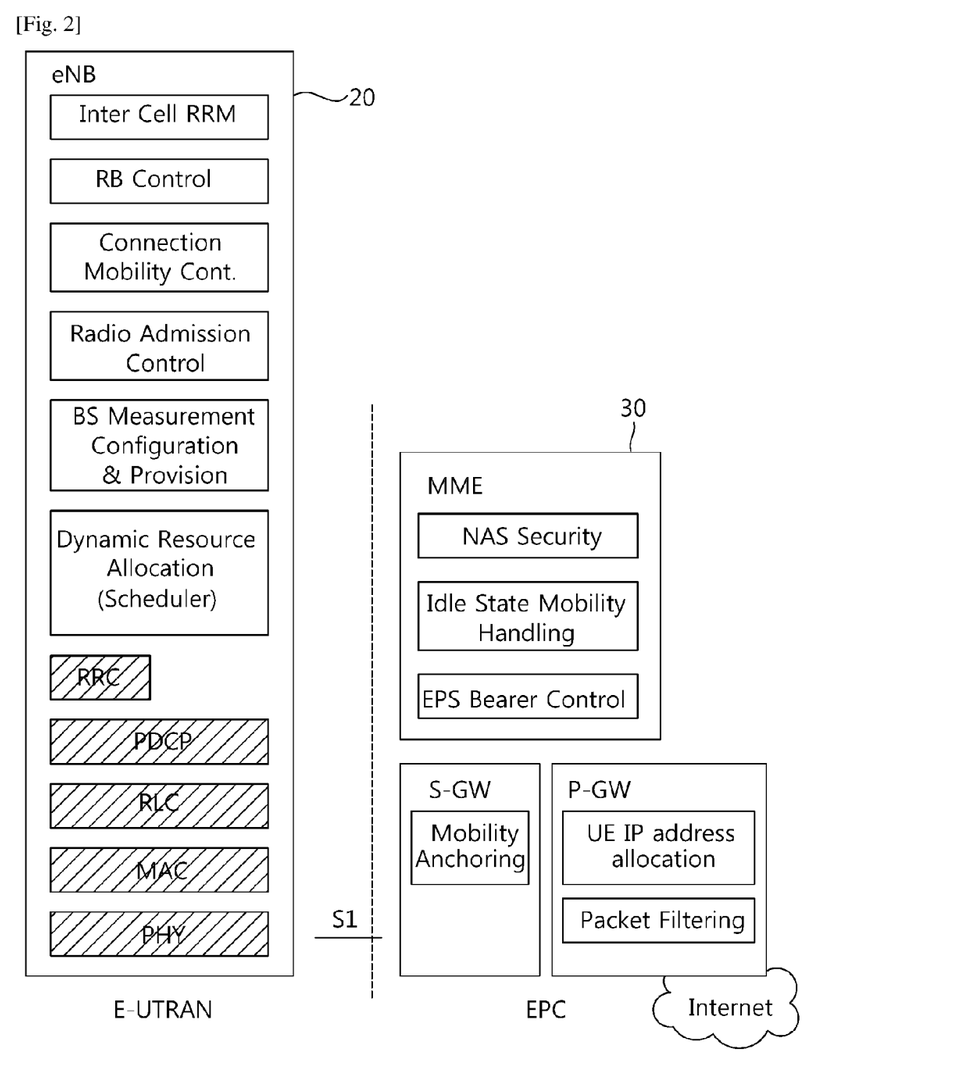
FIG. 2 shows a block diagram of architecture of a typical E-UTRAN and a typical EPC.

FIG. 2 shows a block diagram of architecture of a typical E-UTRAN and a typical EPC. Referring to FIG. 2, the eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 3:
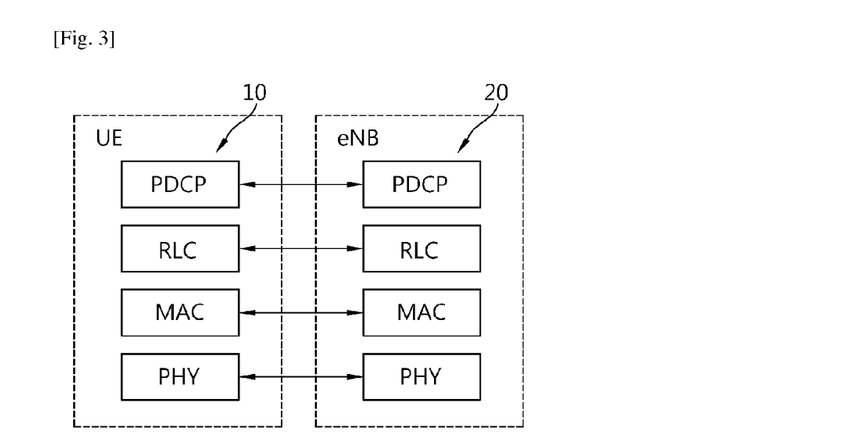
FIG. 3 shows a block diagram of a user plane protocol stack of an LTE system.
Figure 4:
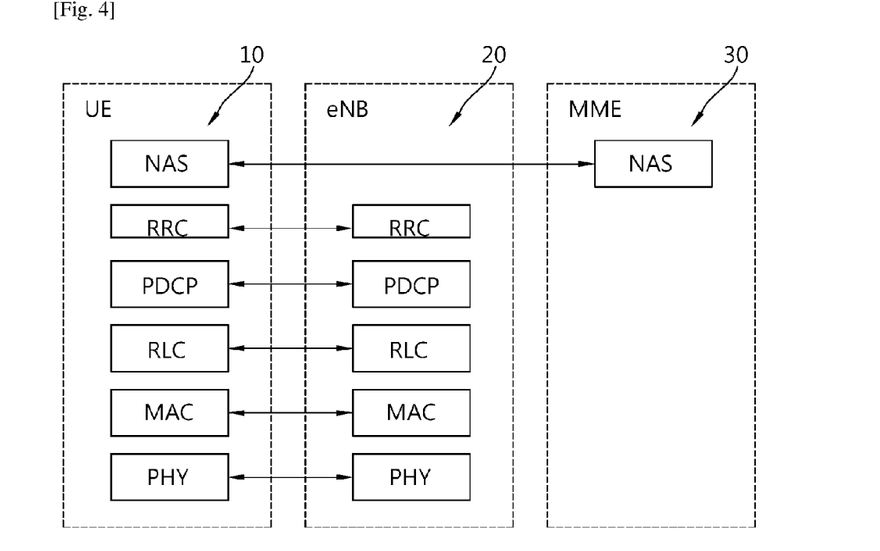
FIG. 4 shows a block diagram of a control plane protocol stack of an LTE system.

FIG. 3 shows a block diagram of a user plane protocol stack of an LTE system. FIG. 4 shows a block diagram of a control plane protocol stack of an LTE system. Layers of a radio interface protocol between the UE and the E-UTRAN may be classified into a first layer (L1), a second layer (L2), and a third layer (L3) based on the lower three layers of the open system interconnection (OSI) model that is well-known in the communication system.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data between the MAC layer and the PHY layer is transferred through the transport channel. Between different PHY layers, i.e., between a PHY layer of a transmission side and a PHY layer of a reception side, data is transferred via the physical channel.

A MAC layer, a radio link control (RLC) layer, and a packet data convergence protocol (PDCP) layer belong to the L2. The MAC layer provides services to the RLC layer, which is a higher layer of the MAC layer, via a logical channel. The MAC layer provides data transfer services on logical channels. The RLC layer supports the transmission of data with reliability. Meanwhile, a function of the RLC layer may be implemented with a functional block inside the MAC layer. In this case, the RLC layer may not exist. The PDCP layer provides a function of header compression function that reduces unnecessary control information such that data being transmitted by employing IP packets, such as IPv4 or IPv6, can be efficiently transmitted over a radio interface that has a relatively small bandwidth.

A radio resource control (RRC) layer belongs to the L3. The RLC layer is located at the lowest portion of the L3, and is only defined in the control plane. The RRC layer controls logical channels, transport channels, and physical channels in relation to the configuration, reconfiguration, and release of radio bearers (RBs). The RB signifies a service provided the L2 for data transmission between the UE and E-UTRAN.

Referring to FIG. 3, the RLC and MAC layers (terminated in the eNB on the network side) may perform functions such as scheduling, automatic repeat request (ARQ), and hybrid ARQ (HARQ). The PDCP layer (terminated in the eNB on the network side) may perform the user plane functions such as header compression, integrity protection, and ciphering.

Referring to FIG. 4, the RLC and MAC layers (terminated in the eNB on the network side) may perform the same functions for the control plane. The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Figure 5:
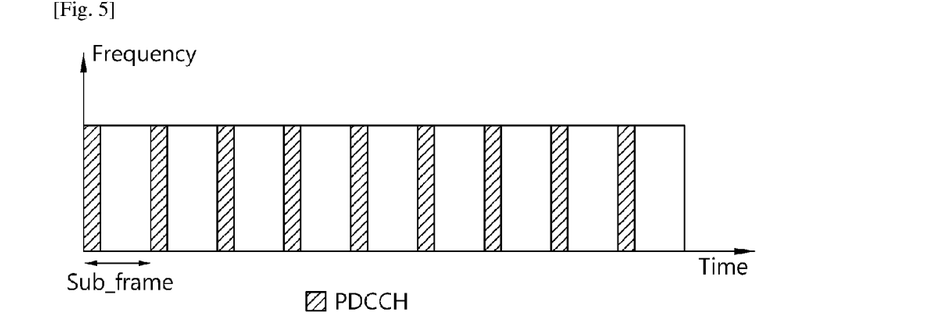
FIG. 5 shows an example of a physical channel structure.

FIG. 5 shows an example of a physical channel structure. A physical channel transfers signaling and data between PHY layer of the UE and eNB with a radio resource. A physical channel consists of a plurality of subframes in time domain and a plurality of subcarriers in frequency domain. One subframe, which is 1 ms, consists of a plurality of symbols in the time domain. Specific symbol(s) of the subframe, such as the first symbol of the subframe, may be used for a physical downlink control channel (PDCCH). The PDCCH carries dynamic allocated resources, such as a physical resource block (PRB) and modulation and coding scheme (MCS).

A DL transport channel includes a broadcast channel (BCH) used for transmitting system information, a paging channel (PCH) used for paging a UE, a downlink shared channel (DL-SCH) used for transmitting user traffic or control signals, a multicast channel (MCH) used for multicast or broadcast service transmission. The DL-SCH supports HARQ, dynamic link adaptation by varying the modulation, coding and transmit power, and both dynamic and semi-static resource allocation. The DL-SCH also may enable broadcast in the entire cell and the use of beamforming.

A UL transport channel includes a random access channel (RACH) normally used for initial access to a cell, a uplink shared channel (UL-SCH) for transmitting user traffic or control signals, etc. The UL-SCH supports HARQ and dynamic link adaptation by varying the transmit power and potentially modulation and coding. The UL-SCH also may enable the use of beamforming.

The logical channels are classified into control channels for transferring control plane information and traffic channels for transferring user plane information, according to a type of transmitted information. That is, a set of logical channel types is defined for different data transfer services offered by the MAC layer.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting multimedia broadcast multicast services (MBMS) control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RRC state indicates whether an RRC layer of the UE is logically connected to an RRC layer of the E-UTRAN. The RRC state may be divided into two different states such as an RRC idle state (RRC_IDLE) and an RRC connected state (RRC_CONNECTED). In RRC_IDLE, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE, no RRC context is stored in the eNB.

In RRC_CONNECTED, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion. A paging message is transmitted over all cells belonging to the same tracking area. If the UE moves from one tracking area (TA) to another TA, the UE will send a tracking area update (TAU) message to the network to update its location.

Wi-Fi is a popular technology that allows an electronic device to exchange data wirelessly (using radio waves) over a computer network, including high-speed Internet connections. The Wi-Fi Alliance defines Wi-Fi as any "wireless local area network (WLAN) products that are based on the IEEE 802.11 standards". However, since most modern WLANs are based on these standards, the term "Wi-Fi" is used in general English as a synonym for "WLAN".

A device that can use Wi-Fi (such as a personal computer, video-game console, smartphone, tablet, or digital audio player) can connect to a network resource such as the Internet via a wireless network access point. Such an access point (or hotspot) has a range of about 20 meters (65 feet) indoors and a greater range outdoors. Hotspot coverage can comprise an area as small as a single room with walls that block radio waves or as large as many square miles—this is achieved by using multiple overlapping access points.

The 802.11 family consist of a series of half-duplex over-the-air modulation techniques that use the same basic protocol. The most popular are those defined by the 802.11b and 802.11g protocols, which are amendments to the original standard. 802.11-1997 was the first wireless networking standard, but 802.11b was the first widely accepted one, followed by 802.11g and 802.11n. 802.11n is a new multi-streaming modulation technique. Other standards in the family (c-f, h, j) are service amendments and extensions or corrections to the previous specifications.

802.11b and 802.11g use the 2.4 GHz industry-science-medical (ISM) band, operating in the United States under Part 15 of the US Federal Communications Commission (FCC) Rules and Regulations. Because of this choice of frequency band, 802.11b and g equipment may occasionally suffer interference from microwave ovens, cordless telephones and Bluetooth devices. 802.11b and 802.11g control their interference and susceptibility to interference by using direct-sequence spread spectrum (DSSS) and OFDM signaling methods, respectively. 802.11a uses the 5 GHz U-NII band, which, for much of the world, offers at least 23 non-overlapping channels rather than the 2.4 GHz ISM frequency band, where adjacent channels overlap. Better or worse performance with higher or lower frequencies (channels) may be realized, depending on the environment.

The segment of the radio frequency spectrum used by 802.11 varies between countries. In the US, 802.11a and 802.11g devices may be operated without a license, as allowed in Part 15 of the FCC Rules and Regulations. Frequencies used by channels one through six of 802.11b and 802.11g fall within the 2.4 GHz amateur radio band. Licensed amateur radio operators may operate 802.11b/g devices under Part 97 of the FCC Rules and Regulations, allowing increased power output but not commercial content or encryption.

Figure 6:
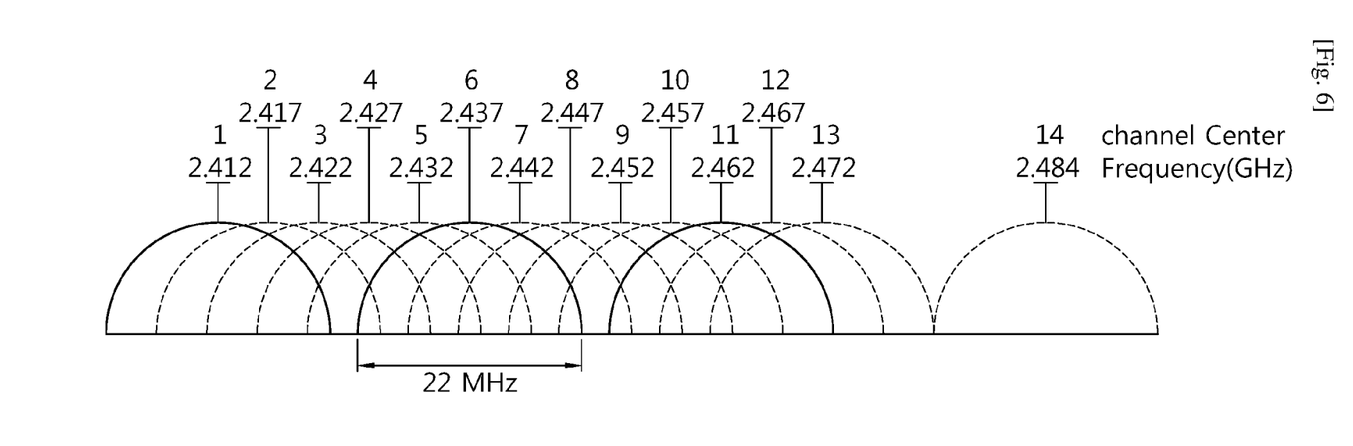
FIG. 6 shows a graphical representation of Wi-Fi channels in 2.4 GHz band.

FIG. 6 shows a graphical representation of Wi-Fi channels in 2.4 GHz band. 802.11 divides each of the above-described bands into channels, analogous to the way radio and TV broadcast bands are sub-divided. For example the 2.4000-2.4835 GHz band is divided into 13 channels spaced 5 MHz apart, with channel 1 centered on 2.412 GHz and 13 on 2.472 GHz (to which Japan added a 14th channel 12 MHz above channel 13 which was only allowed for 802.11b). 802.11b was based on DSSS with a total channel width of 22 MHz and did not have steep skirts. Consequently only three channels do not overlap. Even now, many devices are shipped with channels 1, 6 and 11 as preset options even though with the newer 802.11g standard there are four non-overlapping channels—1, 5, 9 and 13. There are now four because the OFDM modulated 802.11g channels are 20 MHz wide.

In addition to specifying the channel centre frequency, 802.11 also specifies a spectral mask defining the permitted power distribution across each channel. The mask requires the signal be attenuated a minimum of 20 dB from its peak amplitude at ±11 MHz from the centre frequency, the point at which a channel is effectively 22 MHz wide. One consequence is that stations can only use every fourth or fifth channel without overlap, typically 1, 6 and 11 in the Americas, and in theory, 1, 5, 9 and 13 in Europe although 1, 6, and 11 is typical there too. Another is that channels 1-13 effectively require the band 2.401-2.483 GHz, the actual allocations being, for example, 2.400-2.4835 GHz in the UK, 2.402-2.4735 GHz in the US, etc.

For the policy regarding access network selection and/or traffic routing, the radio access network (RAN) provides RAN assistance information (or, RAN assistance parameters), which is used for RAN rule. The RAN rule may indicate condition(s) in which the UE is allowed/required to perform traffic steering from 3GPP LTE to WLAN or vice versa. The condition may involve evaluation of measurement results of 3GPP LTE cell, where the measurement result is compared with a relevant RAN rule parameter (i.e., measurement threshold) included in the RAN assistance information. The condition may also involve evaluation of measurement results of WLAN, where the measurement result is compared with a relevant RAN rule parameter (i.e., measurement threshold) indicated by the RAN assistance information.

The RAN assistance information may be provided to the UE in SystemInformationBlockType17 or in the RRCConnectionReconfiguration message. The RAN assistance information received in SystemInformationBlockType17 is valid only if the UE is camped on a suitable cell.

Table 1 shows an example of the SystemInformationBlockType17 including the RAN assistance information. The SystemInformationBlockType17 contains information relevant for access network selection and traffic steering between E-UTRAN and WLAN.

TABLE 1

```
-- ASN1START
SystemInformationBlockType17-r12 ::= SEQUENCE {
wlan-OffloadPerPLMN-List-r12 SEQUENCE (SIZE (1..maxPLMN-r11))
OF
WLAN-OffloadPerPLMN-r12 OPTIONAL, -- Need OR
lateNonCriticalExtension OCTET STRING OPTIONAL,
...
}
WLAN-OffloadPerPLMN-r12 ::= SEQUENCE {
wlan-OffloadConfigCommon-r12 WLAN-OffloadConfig-r12,
wlan-Id-List-r12 WLAN-Id-List-r12 OPTIONAL
}
WLAN-Id-List-r12 ::= SEQUENCE (SIZE (1..maxWLAN-Id-r12)) OF
WLAN-Id-r12
WLAN-Id-r12 ::= SEQUENCE {
wlan-Identifiers CHOICE {
ssid OCTET STRING (SIZE (1..32)),
bssid OCTET STRING (SIZE (6)),
hessid OCTET STRING (SIZE (6))
}
}
-- ASN1STOP
```

Referring to Table 1, the SystemInformationBlockType17 includes WLAN-OffloadPerPLMN information element (IE). The WLAN-OffloadPerPLMN IE includes wlan-OffloadConfigCommon IE and wlan-Id-List IE. The wlan-OffloadConfigCommon IE is described below. An entry in the wlan-Id-List IE consists of one of ssid, bssid, and hessid IE. bssid IE indicates a basic service set identifier (BSSID) defined in IEEE 802.11 specification. hessid IE indicates a homogenous extended service set identifier (HESSID) defined in IEEE 802.11 specification. ssid IE indicates a service set identifier (SSID) defined in IEEE 802.11 specification.

Table 2 shows an example of WLAN-OffloadConfig IE for the wlan-OffloadConfigCommon IE described above. The WLAN-OffloadConfig IE includes information for traffic steering between E-UTRAN and WLAN.

TABLE 2

```
-- ASN1START
WLAN-OffloadConfig-r12 ::= SEQUENCE {
thresholdRSRP-r12 SEQUENCE {
thresholdRSRP-Low-r12 RSRP-Range,
thresholdRSRP-High-r12 RSRP-Range
```

TABLE 2-continued

```
} OPTIONAL, -- Need OR
thresholdRSRQ-r12 SEQUENCE {
thresholdRSRQ-Low-r12 RSRQ-Range,
thresholdRSRQ-High-r12 RSRQ-Range
} OPTIONAL, -- Need OR
thresholdChannelUtilization-r12 SEQUENCE {
thresholdChannelUtilizationLow-r12 INTEGER (0..255),
thresholdChannelUtilizationHigh-r12 INTEGER (0..255)
} OPTIONAL, -- Need OR
thresholdBackhaul-Bandwidth-r12 SEQUENCE {
thresholdBackhaulDL-BandwidthLow-r12 WLAN-backhaulRate,
thresholdBackhaulDL-BandwidthHigh-r12 WLAN-backhaulRate,
thresholdBackhaulUL-BandwidthLow-r12 WLAN-backhaulRate,
thresholdBackhaulUL-BandwidthHigh-r12 WLAN-backhaulRate
} OPTIONAL, -- Need OR
thresholdBeaconRSSI-r12 SEQUENCE {
thresholdBeaconRSSI-Low-r12 INTEGER (0..255),
thresholdBeaconRSSI-High-r12 INTEGER (0..255)
} OPTIONAL, -- Need OR
offloadPreferenceIndicator-r12 BIT STRING (SIZE (16)) OPTIONAL,
-- Need OR
t-SteeringWLAN-r12 T-Reselection,
...
}
WLAN-backhaulRate ::= ENUMERATED
{r0, r2, r4, r8, r16, r32, r64, r128, r256, r512,
r1024, r2048, r4096, r8192, r16384, r32768, r65536, r131072,
r262144, r524288, r1048576, r2097152, r4194304, r8388608,
r16777216, r33554432, r67108864, r134217728, r268435456,
r536870912, r1073741824, r2147483648, r4294967296}
-- ASN1STOP
```

Referring to Tabled 2, the WLAN-OffloadConfig IE includes various RAN assistance parameters for traffic steering between 3GPP LTE and WLAN, such as parameters regarding 3GPP LTE (e.g., reference signal received power (RSRP), reference signal received quality (RSRQ)) and parameters regarding WLAN (e.g,. WLAN load threshold, WLAN signal level threshold, WAN metric threshold).

Table 3 shows an example of the RRCConnectionReconfiguration message including the RAN assistance information. The RRCConnectionReconfiguration message is the command to modify an RRC connection. It may convey rmation for measurement configuration, mobility control, radio resource configuration (including RBs, MAC main configuration and physical channel configuration) including any associated dedicated NAS rmation and security configuration.

TABLE 3

```
-- ASN1START
RRCConnectionReconfiguration ::= SEQUENCE {
rrc-TransactionIdentifier RRC-TransactionIdentifier,
criticalExtensions CHOICE {
c1 CHOICE{
rrcConnectionReconfiguration-r8 RRCConnectionReconfiguration-r8-IEs,
spare7 NULL,
spare6 NULL, spare5 NULL, spare4 NULL,
spare3 NULL, spare2 NULL, spare1 NULL
},
criticalExtensionsFuture SEQUENCE { }
}
}
RRCConnectionReconfiguration-r8-IEs ::= SEQUENCE {
measConfig MeasConfig OPTIONAL, -- Need ON
mobilityControlInfo MobilityControlInfo OPTIONAL, -- Cond HO
dedicatedInfoNASList SEQUENCE (SIZE(1..maxDRB)) OF
DedicatedInfoNAS OPTIONAL, -- Cond nonHO
radioResourceConfigDedicated RadioResourceConfigDedicated
OPTIONAL, -- Cond
HO-toEUTRA
securityConfigHO SecurityConfigHO OPTIONAL, -- Cond HO
nonCriticalExtension RRCConnectionReconfiguration-v890-IEs
```

TABLE 3-continued

```
OPTIONAL
}
...
RRCConnectionReconfiguration-v12xy-IEs ::= SEQUENCE {
wlan-OffloadDedicated-r12 CHOICE {
release NULL,
setup SEQUENCE {
wlan-OffloadConfig-r12 WLAN-OffloadConfig-r12,
t350-r12 ENUMERATED {min5, min10, min20, min30, min60,
min120, min180, spare1} OPTIONAL-- Need ON
}
} OPTIONAL, -- Need ON
nonCriticalExtension SEQUENCE { } OPTIONAL
}
...
-- ASN1STOP
```

Referring to Table 3, RRCConnectionReconfiguration message includes the WLAN-OFfloadConfig IE described in Table 2 above.

For WLAN selection and/or traffic steering from 3GPP LTE to WLAN, the UE may acquire attributes of WLANs by receiving WLAN beacon, probe response which is response to a probe request or performing access network query protocol (ANQP) procedures if both the UE and the access point (AP) support hotspot (HS) 2.0. By comparing the acquired attributes of WLANs with the received RAN assistance information, the UE may perform access network selection and/or traffic steering from 3GPP LTE to WLAN and vice versa.

However, it is possible that the AP does not provide the some attributes through the beacon depending on the setting of the AP. In addition, either UE or AP may not be capable of HS 2.0. In these cases, the UE may not acquire some attributes. The UE behavior is not clear if the UE is provided with the RAN assistance information for access network selection and/or traffic steering from 3GPP LTE to WLAN and vice versa, but the UE is not able to acquire some attributes.

In order to solve the problem above, a method for performing traffic steering from 3GPP access network (e.g., (E-)UTRAN) to WLAN according to an embodiment of the present invention is described below. In order to define the UE behaviour regarding access network selection and/or traffic steering when the UE receives the RAN assistance information and the UE is not able to acquire one or more attributes regarding RAN assistance information, the UE may additionally receive an indication indicating that it is allowed to ignore the received RAN assistance information for evaluating traffic steering policy. The UE may try to acquire the related attributes from the source and the target access network and may determine not to evaluate the traffic steering policy for the indicated RAN assistance information if the attributes are not acquired.

The UE may be allowed to ignore the indicated RAN assistance information if the UE is not capable of acquiring the attributes regarding the indicated RAN assistance information due to UE's capability, or if the UE is not able to acquire the attributes regarding the indicated RAN assistance information due to the concerned access network not providing the attributes. However, if the UE acquires the related attributes regarding the indicated RAN assistance information, the UE may evaluates traffic steering policy for the indicated RAN assistance information.

For the RAN assistance information which is not indicated by the indication, the UE should evaluate traffic steering policy for the RAN assistance information. If the UE does not acquire the attributes regarding the RAN assistance information which is not indicated by the indication, the UE does not consider the concerned access network as target access network.

The indication may be provided for each parameter included in the RAN assistance information. That is, the indication may indicate whether to allow to ignore the specific parameter in the RAN assistance information. Or, the indication may be provided for whole RAN assistance information. That is, the indication may indicate whether to allow to ignore the whole RAN assistance information.

The RAN assistance information may include accessible candidate WLANs as well as at least one of parameters regarding 3GPP LTE, such as 3GPP RSRP/RSRQ threshold, 3GPP RAN load threshold, indication to steer to/from WLAN, or parameters regarding WLAN, such as WLAN signal power/quality threshold (e.g,. beacon BSSI), WLAN load (e.g., channel utilization) threshold, WLAN WAN metric (e.g., UL/DL backhaul available data rate). The RAN assistance information may be provided via dedicated signaling (e.g., the RRCConnectionReconfiguration message) or broadcast signaling (e.g., the SystemInformationBlockType17). The traffic steering policy may be access network discovery and selection functions (ANDSF) or policy specified in RAN specification.

Figure 7:
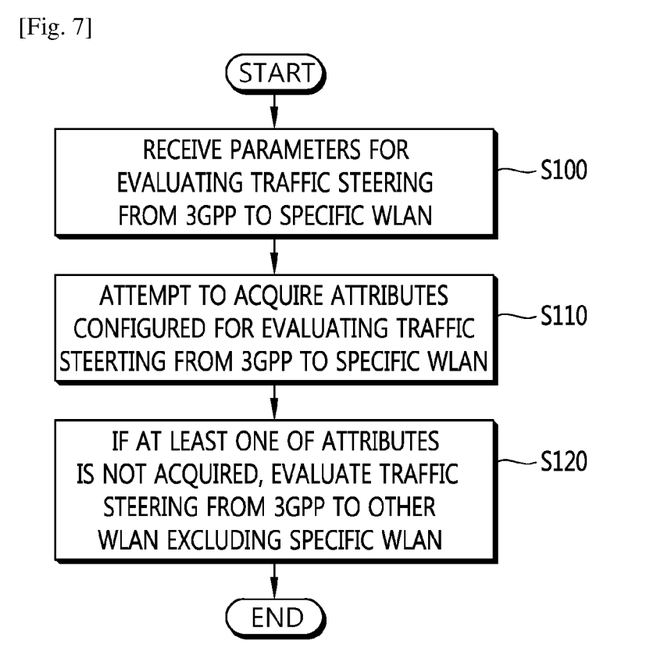
FIG. 7 shows an example of a method for performing traffic steering from 3GPP to WLAN according to an embodiment of the present invention.

FIG. 7 shows an example of a method for performing traffic steering from 3GPP to WLAN according to an embodiment of the present invention.

In step S100, the UE receives a list of WLANs and parameters for evaluating traffic steering from 3GPP to WLANs in the list. The parameters for evaluating traffic steering may be received via a dedicated signaling (e.g., the RRCConnectionReconfiguration message) or broadcast signaling (e.g., the SystemInformationBlockType17). The parameters for evaluating traffic steering may include at least one of parameters for the 3GPP or parameters for WLANs. The parameters for the 3GPP may include at least one of RSRP/RSRQ threshold, 3GPP RAN load threshold, or indication to steer traffic to or from WLAN. The parameters for the specific WLAN may include at least one of WLAN signal power/quality threshold, WLAN load threshold, or a WLAN wide area network (WAN) metric.

In step S110, the UE attempts to acquire attributes which correspond to the parameters and are configured for evaluating traffic steering from 3GPP to the WLANs. If at least one of the attributes is not acquired for a specific WLAN in the list, in step S120, the UE evaluates traffic steering from 3GPP to other WLANs excluding the specific WLAN. That is, the UE does not consider the specific WLAN as target access network.

Figure 8:
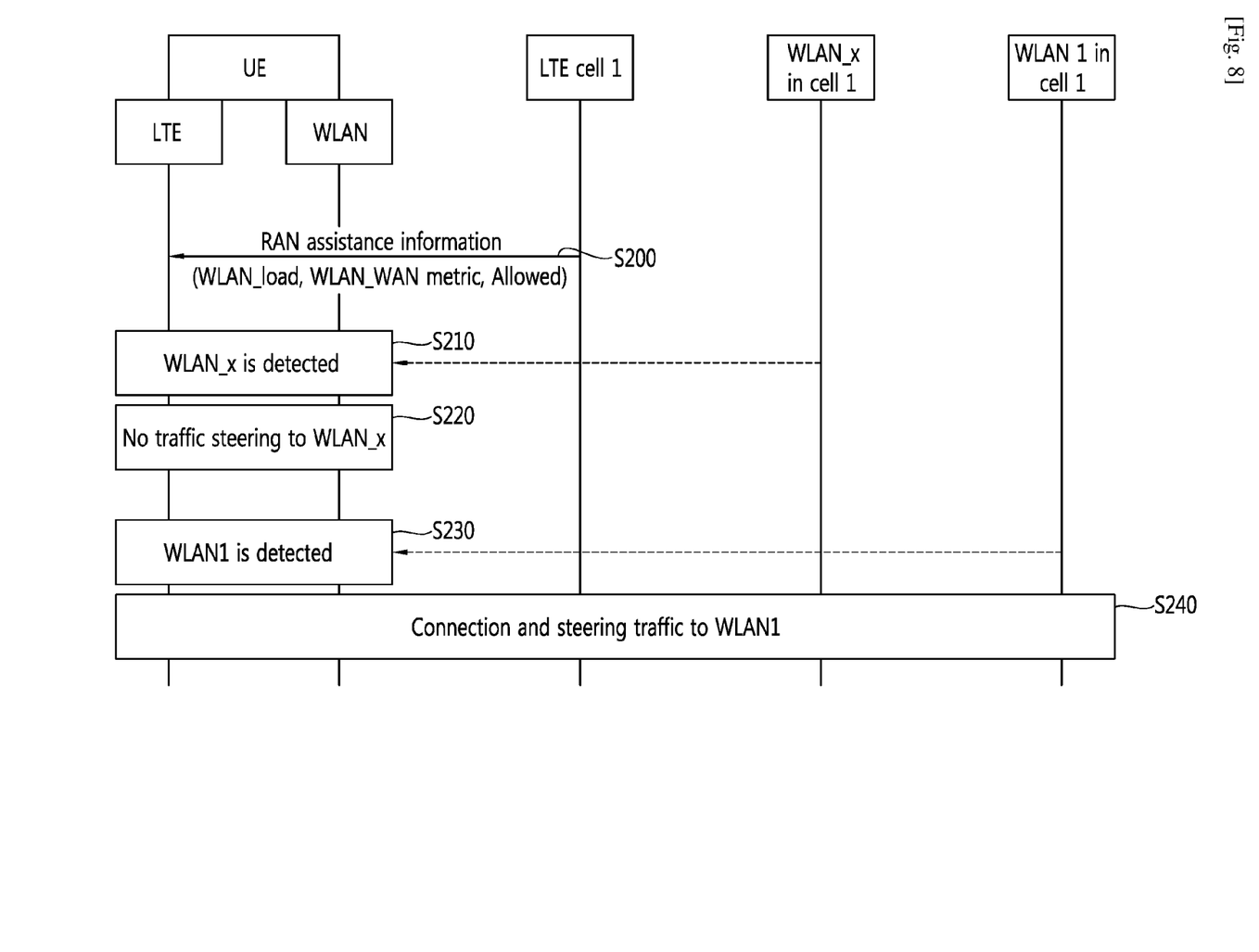
FIG. 8 shows another example of a method for performing traffic steering from 3GPP to WLAN according to an embodiment of the present invention.

FIG. 8 shows another example of a method for performing traffic steering from 3GPP to WLAN according to an embodiment of the present invention. In FIG. 8, it is assumed that WLAN_x does not provide WLAN load information (e.g. channel utilization) while WLAN1 provides WLAN load information. It is also assumed that both WLAN_x and WLAN 1 do not provide WLAN WAN information. Further in FIG. 8, 'allowed' in the RAN assistance information indicates that the parameter is allowed to be ignored in evaluation for traffic steering.

In step S200, the LTE cell 1 provides RAN assistance information via broadcast signaling. The RAN assistance information includes parameters, i.e., WLAN load threshold, and WLAN WAN metric threshold. The RAN assistance information further includes an indication indicating parameters which are allowed to be ignored in evaluating for traffic steering. The indication indicates that the UE should evaluate whether the received load level of the target WLAN satisfies the WLAN load threshold, while the UE is able to ignore the WLAN WAN metric threshold if the UE is not able to acquire WLAN WAN information from the target WLAN in evaluating the target WLAN.

In step S210, the UE detects the WLAN_x and tries to acquire the attributes from the WLAN_x. Since the WLAN_x does not provide WLAN load information and WLAN WAN information, the UE is not able to acquire the WLAN load information and WLAN WAN information from the WLAN_x. Accordingly, in step S220, the UE determines not to steer traffic to the WLAN_x, since the UE is not able to acquire the WLAN load information which the UE should evaluate.

In step S230, the UE detects the WLAN1 and tries to acquire the attributes from the WLAN1. Since the WLAN1 provides only WLAN load information (i.e., the WLAN1 does not provide WLAN WAN information), the UE is able to acquire only WLAN load information from the WLAN1. Even though the UE cannot acquire the WLAN WAN information, since the network indicates that the UE is allowed to ignore to evaluate the WLAN WAN information, the UE still considers the WLAN1 as candidate. Accordingly, in step S240, the UE determines to steer traffic to the WLAN1 since the UE acquires the WLAN load information which the UE should evaluate and the acquired attributes (information) satisfies the threshold received via the RAN assistance information.

Figure 9:
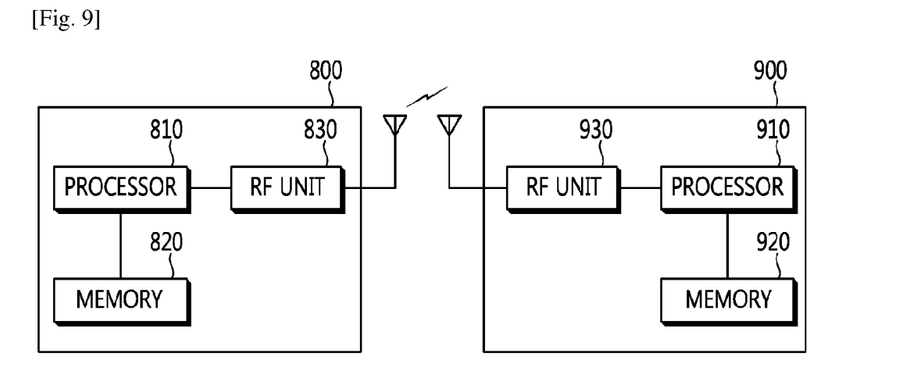
FIG. 9 shows a wireless communication system to implement an embodiment of the present invention.

FIG. 9 shows a wireless communication system to implement an embodiment of the present invention.

An eNB 800 may include a processor 810, a memory 820 and a radio frequency (RF) unit 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A UE 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

The invention claimed is:

1. A method for performing, by a user equipment (UE), traffic steering from a 3rd generation partnership project (3GPP) access network to a wireless local area network (WLAN) in a wireless communication system, the method comprising:
receiving, by the UE from an evolved NodeB (eNB) of the 3GPP access network, radio access network (RAN) assistance information for evaluating traffic steering from the 3GPP access network to the WLAN;
attempting, by the UE, to acquire attributes related to the RAN assistance information from a specific WLAN; and
if at least one of the attributes is not acquired from the specific WLAN, evaluating, by the UE, traffic steering from the 3GPP access network to the WLAN excluding the specific WLAN,
wherein the RAN assistance information includes a WLAN signal power threshold and a WLAN load threshold.

2. The method of claim 1, wherein the RAN assistance information is the received via a dedicated signaling or broadcast signaling.

3. The method of claim 2, wherein the dedicated signaling is a radio resource control (RRC) connection reconfiguration message.

4. The method of claim 2, wherein the broadcast signaling is a system information block (SIB) type 17.

5. The method of claim 1, wherein the RAN assistance information includes at least one of a reference signal received power (RSRP) threshold, a reference signal received quality (RSRQ) threshold, a 3GPP RAN load threshold, or an indication to steer traffic to or from the WLAN.

6. A user equipment (UE) in a wireless communication system, the UE comprising:
a memory;
a radio frequency (RF) unit; and
a processor, operably coupled to the memory and the RF unit, that:
controls the RF unit to receive, from an evolved NodeB (eNB) of a $3^{rd}$ generation partnership project (3GPP) access network, radio access network (RAN) assistance information for evaluating traffic steering from the 3GPP access network to a wireless local area network (WLAN),
attempts to acquire attributes related to the RAN assistance information from a specific WLAN, and
if at least one of the attributes is not acquired from the specific WLAN, evaluates traffic steering from the 3GPP access network to the WLAN excluding the specific WLAN, wherein the RAN assistance information includes a WLAN signal power threshold and a WLAN load threshold.

7. The UE of claim 6, wherein the RAN assistance information is received via a dedicated signaling or broadcast signaling.

8. The UE of claim 7, wherein the dedicated signaling is a radio resource control (RRC) connection reconfiguration message.

9. The UE of claim 7, wherein the broadcast signaling is a system information block (SIB) type 17.

10. The UE of claim 6, wherein the RAN assistance information includes at least one of a reference signal received power (RSRP) threshold, a reference signal received quality (RSRQ) threshold, a 3GPP RAN load threshold, or an indication to steer traffic to or from the WLAN.

\* \* \* \* \*